United States Patent [19]
Gammenthaler, Jr. et al.

[11] Patent Number: 5,970,072
[45] Date of Patent: Oct. 19, 1999

[54] SYSTEM AND APPARATUS FOR TELECOMMUNICATIONS BUS CONTROL

[75] Inventors: Robert Scott Gammenthaler, Jr., Frisco; Bracey James Blackburn, Garland; Donald Barton Hay, Dallas; Thomas Edward Cooper, Richardson; Serge François Fourcand, Allen; Long Van Vo, Garland, all of Tex.

[73] Assignee: Alcatel USA Sourcing, L.P., Plano, Tex.

[21] Appl. No.: 08/944,622

[22] Filed: Oct. 2, 1997

[51] Int. Cl.[6] ............................................. H04J 3/02
[52] U.S. Cl. .......................... 370/537; 370/366; 370/395
[58] Field of Search .................................. 370/360, 362, 370/363, 364, 366, 367, 368, 537, 538, 539, 540, 541, 395, 389, 396, 398

[56] References Cited

U.S. PATENT DOCUMENTS

| | | |
|---|---|---|
| 4,864,562 | 9/1989 | Murakami et al. ...................... 370/538 |
| 4,920,534 | 4/1990 | Adelmann et al. ...................... 370/474 |
| 5,173,901 | 12/1992 | DeSomer . |
| 5,392,284 | 2/1995 | Sugiyama ................................ 370/465 |
| 5,452,330 | 9/1995 | Goldstein . |
| 5,502,493 | 3/1996 | Meyer ...................... 348/845 |
| 5,615,211 | 3/1997 | Santore et al. .......................... 370/419 |
| 5,621,428 | 4/1997 | King et al. .............................. 345/118 |

FOREIGN PATENT DOCUMENTS

| | | | |
|---|---|---|---|
| 9528786 | 10/1995 | WIPO ........................... H04L 12/403 |
| 9701257 | 1/1997 | WIPO ............................. H04Q 11/04 |

*Primary Examiner*—Ajit Patel
*Assistant Examiner*—Bob A. Phunkulh
*Attorney, Agent, or Firm*—Baker & Botts, L.L.P.

[57] ABSTRACT

A data bus controller is provided. The data bus controller comprises an ingress interface that receives single data streams of encoded data. A multiplexer is connected to the ingress interface and combines the single data streams into a broadcast data stream of encoded data. An egress interface connected to the multiplexer transmits the broadcast data stream. An arbiter is connected to the multiplexer. The arbiter generates control data for controlling the multiplexing of the single data streams and transmits control data to the multiplexer.

32 Claims, 4 Drawing Sheets

SYSTEM AND APPARATUS FOR TELECOMMUNICATIONS BUS CONTROL

TECHNICAL FIELD OF THE INVENTION

The present invention relates in general to telecommunications data switching and more particularly to a system and apparatus for controlling telecommunications buses.

BACKGROUND OF THE INVENTION

Modern telecommunications system typically utilize digitally encoded data instead of analog data. If analog data is used, it is converted to digital data for the purposes of switching the data between conducting media. Switching of data occurs at large telecommunications switches, which may receive and process hundreds or thousands of data channels.

In the process of being switched, two or more individual data streams may be combined to form a single data stream. When two or more data streams are combined, the total amount of data being transmitted, or bandwidth, of the combined data stream equals the sum of the bandwidths of each of the individual data streams. Accurate control is required when combining the two or more individual data streams into a single data stream in order to prevent corruption of data on the data bus.

Although it is common to combine two or more data streams into a single data stream with equal bandwidth, it is not unusual for data transmission errors to be created when such combinations are created. Such errors prevent additional data processing from being performed on the two or more data streams while they are being combined, as the additional data processing would make such errors difficult or impossible to detect.

SUMMARY OF THE INVENTION

Therefore, a need has arisen for a system and method for combining two or more data streams that allows additional data processing to be performed on the two or more data streams while they are being combined.

In accordance with the present invention, a system and method for data bus control is provided that substantially eliminates or reduces disadvantages and problems associated with previously developed systems and methods for combining data streams.

One aspect of the present invention is a data bus controller that comprises an ingress interface that receives single data channels of encoded data. A multiplexer is connected to the ingress interface and combines the single data channels into a broadcast data channel of encoded data. An egress interface connected to the multiplexer transmits the broadcast data channel. An arbiter is connected to the multiplexer. The arbiter generates control data for controlling the multiplexing of the single data channels and transmits control data to the multiplexer.

One advantage of the present invention is a data bus controller with the ability to control both synchronous transfer mode data and asynchronous transfer mode data. The ability to control synchronous and asynchronous transfer mode data with a single data bus controller greatly improves the efficiency and flexibility of the data bus controller.

Another advantage of the present invention is a system for data bus control that allows multiple incoming data buses to be multiplexed into a single outgoing data bus. Combination of multiple incoming high speed data buses into a single outgoing high speed data bus allows the system for data bus control to perform some switching functions, thus improving the efficiency and flexibility or any telecommunications switches associated with the data bus control system.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Preferred embodiments of the present invention are illustrated in the figures, like numbers being used to refer to like and corresponding parts of the various drawings.

Figure 1:
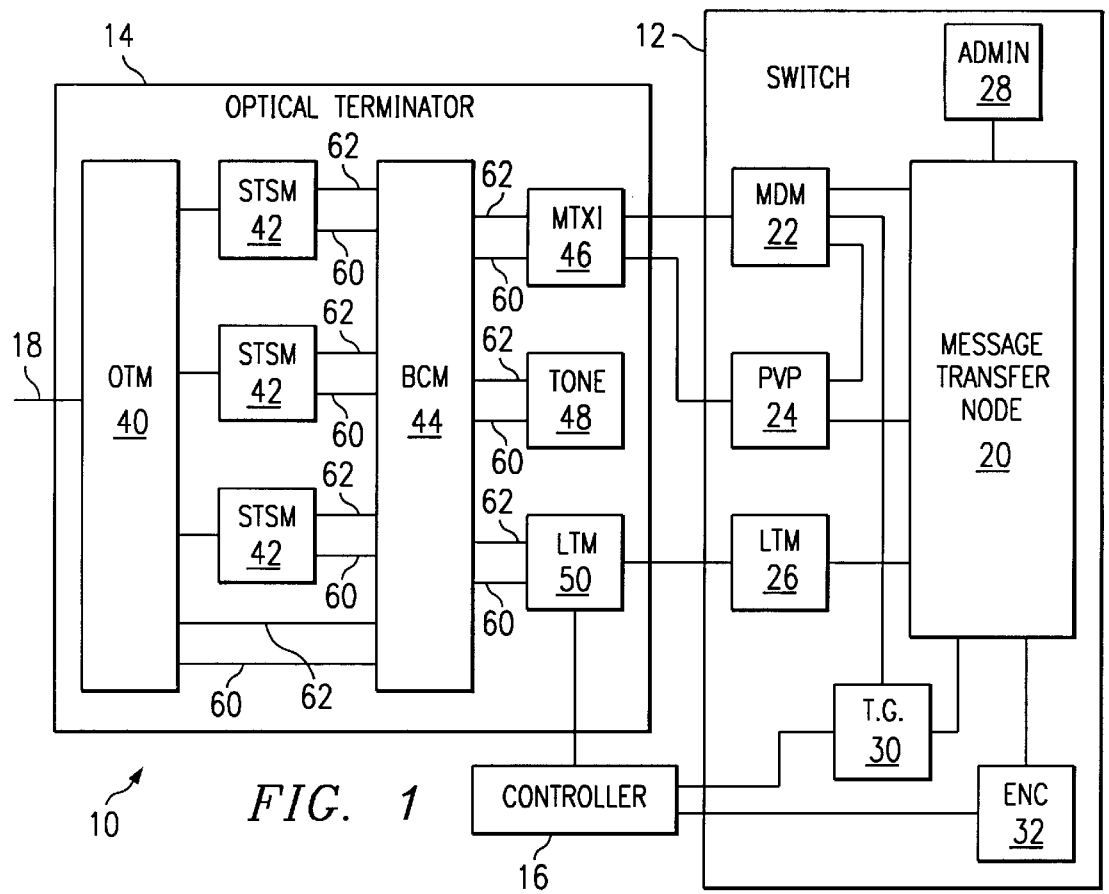
FIG. 1 is a system block diagram of an optical fiber-capable telecommunications switch system embodying concepts of the present invention.

FIG. 1 is a block diagram of optical fiber-capable telecommunications switch system 10 embodying concepts of the present invention. In particular, the data bus interface of the present invention is a modular system designed for incorporation into individual telecommunications components, such as the individual components of telecommunications switch system 10. The data bus interface of the present invention may also or alternatively be used in other telecommunications components that interface to data buses.

Optical fiber-capable telecommunications switch system 10 includes switch 12 connected to fiber optic connection unit (OPTICAL TERMINATOR) 14 and common controller 16. Optical telecommunications data streams, such as one or more streams of bit-serial data, byte-serial data, or serial frames of data, are received over one or more fiber optic conductors 18 at fiber optic connection unit 14. These telecommunications data streams are converted to electrical signals by fiber optic connection unit 14 and are transmitted to switch 12 for switching between data channels. Switch 12 may switch data channels of any suitable size, such as DS-0, DS-1, DS-3, or other suitable channels. Furthermore, any stream of data may comprise one or more channels of data having a suitable format, such as DS-0, DS-1, DS-3, or other suitable channels. Common controller 16 receives control data from and transmits control data to fiber optic connection unit 14 and switch 12.

Switch 12 is a telecommunications switch having M input channels and N output channels, where M and N are integers. Switch 12 receives telecommunications data at any of the M input channels and transfers the telecommunications data to any of the N output channels. Switch 12, as shown in FIG. 1, is a digital switch, but may also be an analog switch. Switch 12 may include, for example, a Megahub 600E Digital Telecommunications Switch manufactured by DSC Communications Corporation of Plano, Tex. Switch 12 includes a message transport node 20 coupled to a matrix data multiplexer circuit (MDM) 22, a matrix control path verification processor (PVP) 24, a line trunk manager circuit (LTM) 26, administration circuit (ADMIN) 28, timing generator circuit (TG) 30, and Ethernet network circuit (ENC) 32.

Matrix data multiplexer circuit 22 is further coupled to matrix control path verification processor 24 and timing generator circuit 30. Matrix data multiplexer circuit 22 is an interface circuit that may be used for coupling data channels between fiber optic connection unit 14 and the switching matrix (not explicitly shown) of switch 12. In particular, matrix data multiplexer circuit 22 provides the interface for DS-0 data. Matrix data multiplexer circuit 22 receives 2048 channels of DS-0 data from fiber optic connection unit 14 on a 10-bit parallel data channel operating at a frequency of 16.384 MHZ. These DS-0 data channels are then transmitted to the M input ports of the switching matrix of switch 12.

Control commands received at switch 12 from common controller 16 are used to determine the proper connections between the M input ports and the N output ports of the switching matrix. The DS-0 data channels are transmitted through the switching matrix after the connections have been formed. The DS-0 data channels received at matrix data multiplexer circuit 22 from the N output ports of the switching matrix are then transmitted back to fiber optic connection unit 14.

Matrix control path verification processor 24 is coupled to fiber optic connection unit 14 and to message transport node 20. Matrix control path verification processor 24 is a switching matrix administration and control component that processes matrix channel low level fault detection and fault isolation data.

Line trunk manager circuit 26 is coupled to fiber optic connection unit 14 and message transport node 20. Line trunk manager circuit 26 is a switching matrix control component that receives and transmits data relating to call processing functions for fiber optic connection unit 14.

Timing generator circuit 30 is coupled to matrix data multiplexer circuit 22, message transport node 20, and common controller 16. Timing generator circuit 30 is a switch timing circuit that receives timing data from an external source, such as fiber optic connection unit 14, and transmits the timing data to components of switch 12.

Ethernet network circuit 32 is coupled to message transport node 20 and common controller 16. Ethernet network circuit 32 is a data communications interface, and transfers data between message transport node 20 and common controller 16.

Fiber optic connection unit 14 includes an optical interface circuit (OTM) 40, STSM circuits (STSM) 42, a bus control circuit (BCM) 44, a matrix interface circuit (MTXI) 46, a tone recognition circuit (TONE) 48, and a high speed line trunk processor circuit (LTP) 50. Fiber optic connection unit 14 receives digitally encoded optical data from fiber optic conductor 18, performs broadcast switching of the data streams received from fiber optic conductor 18, transmits synchronous transfer mode (STM) telecommunication data to matrix data multiplexer circuit 22 and matrix control path verification processor 24 for switching through the switching matrix of switch 12, and receives the switched telecommunications data from switch 12 for transmission over fiber optic conductor 18.

Optical interface circuit 40 is capable of terminating optical signals, for example OC-3, that are connected to the public switched network (PSN). Optical interface circuit 40 receives digitally encoded optical telecommunications data from fiber optic conductor 18 and converts the optical signals into electrical signals, for example digital signals having an STS-3 data format, for transmission to other components of fiber optic connection unit 14. Optical interface circuit 40 is coupled to fiber optic conductor 18 and to STSM circuits 42.

Optical interface circuit 40 may comprise a single circuit card that has plug-in connectors (not explicitly shown) to allow the card to be easily installed in a cabinet containing other component circuit cards of fiber optic connection unit 14. Alternatively, optical interface circuit 40 may comprise two or more circuit cards, or one or more discrete components on a circuit card.

Application circuits are generally any telecommunications data transmission system components that are coupled to bus control circuit 44. Each application circuit may comprise a single circuit card with plug-in connectors (not explicitly shown) in order to be easily installed in a rack containing fiber optic connection unit 14. Alternatively, each application circuits may comprise multiple circuit cards, or individual components on a single circuit card.

As shown in FIG. 1, STSM circuits 42 are configured to receive data from and transmit data to optical interface circuit 40. This data may comprise synchronous transfer mode telecommunications data. For example, STSM circuits 42 may receive a single STS-1P channel of data that includes payload data comprising 672 DS-0 data channels, where each DS-0 data channel is a continuous stream of data equal to 64,000 bits per second. The STS-1P data format also includes administration, control, and routing data that may be included in a commercially standard STS-1 data format, plus additional proprietary administration, control, and routing data. The administration data, control data, and routing data is used to separate the individual DS-0 data channels within the STS-1P data channel, perform path verification, perform equipment diagnostic monitoring, and other suitable functions.

STSM circuits 42 may also receive asynchronous transfer mode (ATM) telecommunications data, such as data transmitted as iMPAX packet layer datagrams or other suitable data formats. An iMPAX packet layer datagram is a proprietary 512-bit data format that includes 4 bits of payload type identification data, a 76-bit header section, a 424-bit payload section, and an 8-bit control record check section. Asynchronous transfer mode data may be transmitted as a single stream of fixed bit format data frames that comprise additional streams of data. The number of data frames transmitted per second for a given data stream may be varied for asynchronous transfer mode data in order to accommodate fluctuations in the amount of data per stream and the number of data streams transferred.

Bus control circuit 44 may be coupled to a number of other application circuits with suitable functions, such as matrix interface circuit 46, tone recognition circuit 48, and high speed line trunk processor circuit 50. All application circuits transmit data to bus control circuit 44 over ingress buses 60 and receive data from bus control circuit 44 over egress buses 62. These application circuits may also comprise a modular bus interface circuit (not explicitly shown). The modular bus interface circuit receives data from the application circuit and converts it into a predetermined format for transmission over ingress bus 60. The modular bus interface circuit also receives data in a predetermined format over egress bus 62 and converts it into a format that is useable by the application circuit associated with the bus interface circuit.

Bus control circuit 44 receives telecommunications data in a predetermined format from application circuits over ingress buses 60, multiplexes the data into a single broadcast data stream in a predetermined format, and transmits the broadcast data stream over egress buses 62. In this manner, bus control circuit 44 also operates as a broadcast switching device. Each application circuit receives the broadcast data stream containing data from other application circuits, and can process selected data in a suitable manner. For example, STSM circuit 42 may transmit the data back to optical interface circuit 40 for transmission on fiber optic conductor 18 to the network. Bus control circuit 44 may comprise a single circuit card with plug-in connectors (not explicitly shown) in order to be easily used in a rack containing fiber optic connection unit 14. Alternatively, bus control circuit 44 may comprise multiple circuit cards, or individual components on a single circuit card.

Matrix interface circuit 46 provides the protocol and transport format conversion between fiber optic connection unit 14 and switch 12. Matrix interface circuit 46 is an application circuit that selects desired data channels from the broadcast data stream transmitted by bus control circuit 44, and reformats and transmits the data to switch 12. Matrix interface circuit 46 is coupled to bus control circuit 44, matrix data multiplexer circuit 22, and matrix control path verification processor 24. Matrix interface circuit 46 converts the data format of the broadcast data stream received from bus control circuit 44 and switch 12 into a data format that is compatible with switch 12 and bus control circuit 44, respectively. Matrix interface circuit 46 may comprise a single circuit card with plug-in connectors (not explicitly shown) in order to be easily used in a rack containing fiber optic connection unit 14. Alternatively, matrix interface circuit 46 may comprise multiple circuit cards, or individual components on a single circuit card.

Tone recognition circuit 48 is an application circuit that is coupled to bus control circuit 44 and performs tone recognition functions for fiber optic connection unit 14. One pair of tone recognition circuits 48 may be required for every 2016 matrix ports of switch 12. Tone recognition circuit 48 interfaces with the broadcast data stream and detects data representative of keypad tones on each DS-0 channel that comprises the broadcast data stream, up to 2016 DS-0 data channels.

Tone recognition circuit 48 has an array of digital signal processor devices (not explicitly shown) that can be configured to provide tone detection and generation. Tone recognition circuit 48 may comprise a single circuit card with plug-in connectors (not explicitly shown) in order to be easily used in a rack containing fiber optic connection unit 14. Alternatively, tone recognition circuit 48 may comprise multiple circuit cards, or individual components on a single circuit card.

High speed line trunk processor circuit 50 is the primary shelf controller for all of the circuit cards in fiber optic connection unit 14 and provides the interface between fiber optic connection unit 14 and switch 12. High speed line trunk processor circuit 50 contains a microprocessor and a communications interface to line trunk manager circuit 26.

High speed line trunk processor circuit 50 may comprise a single circuit card with plug-in connectors (not explicitly shown) in order to be easily used in a rack containing fiber optic connection unit 14. Alternatively, high speed line trunk processor circuit 50 may comprise multiple circuit cards, or individual components on a single circuit card.

Ingress buses 60 are data buses that carry a data stream with a predetermined bit structure and a predetermined frequency from an application circuit to bus control circuit 44. For example, each ingress bus 60 may comprise a data stream with 8 parallel bits operating at a frequency of 25.92 MHZ. Other bit structures and frequencies may be used where suitable.

Egress buses 62 are data buses that carry a data stream with a predetermined bit structure and a predetermined frequency to an application circuit from bus control circuit 44. For example, each egress bus 62 may comprise a data stream with 16 parallel bits operating at a frequency of 51.84 MHZ. Other bit structures and frequencies may be used where suitable.

Common controller 16 is coupled to switch 12 and fiber optic connection unit 14. Common controller 16 is a processor that receives administration, control, and routing data from switch 12 and fiber optic connection unit 14, and generates administration, control and routing data that coordinates the operation of switch 12 and fiber optic connection unit 14. Common controller 16 may alternatively be incorporated within switch 12 or fiber optic connection unit 14.

In operation, telecommunications data from the network is transmitted via fiber optic conductor 18 and received by fiber optic connection unit 14. This telecommunications data is then converted into electrical signals and is transmitted from optical interface circuit 40 through STSM circuit 42 and to bus control circuit 44 over ingress bus 60. Bus control circuit 44 multiplexes the data received from each application circuit into a single broadcast data stream and transmits the broadcast data stream over each egress bus 62.

The broadcast data stream is transmitted to switch 12 through matrix interface circuit 46. Switch 12 performs switching on the individual DS-0 data channels, such as by restructuring the order in which the DS-0 data channels are sequenced. The DS-0 data channels are then transmitted back to matrix interface circuit 46. Matrix interface circuit 46 transmits the DS-0 data channels to bus control circuit 44 over ingress bus 60 in a predetermined format. Bus control circuit 44 then generates the broadcast data stream, including the DS-0 data channels that have been switched through switch 12. The broadcast data stream is received at STSM circuits 42 for retransmission through fiber optic conductor 18 via optical interface circuit 40. The broadcast data may also or alternatively be transmitted to matrix interface circuit 46, tone recognition circuit 48, high speed line trunk processor circuit 50, or other suitable circuits for suitable data processing.

Figure 2:
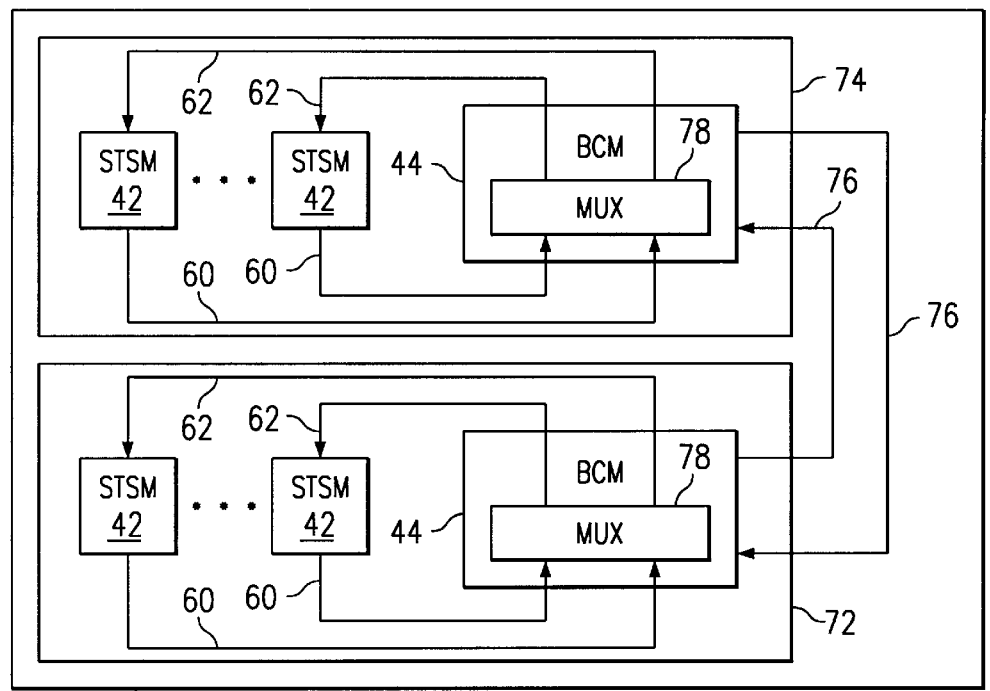
FIG. 2 is a block diagram of interconnections between application circuits and bus control circuits embodying the concepts of the present invention.

FIG. 2 is a connection diagram of a bus control system 70 showing the connections between STSM circuits 42 and bus control circuits 44. A suitable number of application circuits such as STSM circuits 42 may be coupled to multiplexer 78 (MUX) of bus control circuits 44 via ingress buses 60. Each STSM circuit 42 transmits a single data stream of encoded data to bus control circuit 44 over an associated ingress bus 60. The single data streams of encoded data received from each ingress bus 60 at multiplexer 78 are then combined by bus control circuit 44 into a broadcast data stream. The broadcast data stream is transmitted from multiplexer 78 over egress buses 62 to STSM circuits 42 and other application circuits. The broadcast data stream comprises some or all of the data from each single data stream, which is encoded in a format that allows any part of the data to be identified and located within the broadcast data stream.

System 72 and system 74 of bus control system 70 may comprise components such as STSM circuits 42, ingress buses 60, bus control circuits 44, and egress buses 62. Bus control circuits 44 of system 72 and system 74 are coupled together via high speed links 76, which are high frequency data streams, such as 16-bit parallel data channels operating at 51.84 MHZ. The broadcast data stream received at system 72 from system 74 via high speed link 76 may be multiplexed in part or in whole into the broadcast data stream transmitted from system 72 to system 74, in response to administration, control, and routing data. The broadcast data stream received at system 74 from system 72 via high speed link 76 may also be multiplexed in part or in whole into the broadcast data stream transmitted from system 74 to system 72.

System 72 and system 74 may each be configured as completely redundant physical planes carrying redundant data streams for the telecommunications data received via fiber optic conductor 18. In this configuration, multiple failures of individual components in the redundant planes of system 72 and system 74 would not interrupt data transmission as long as one complete data transmission path remains available.

In operation, bus control circuit 44 of system 72 receives a plurality of single data streams in a predetermined data format from each of ingress buses 60 and multiplexes the single data streams into a first broadcast data stream having a predetermined data format. Bus control circuit 44 of system 72 then transmits the first broadcast data stream to application circuits 42 over egress buses 62. Bus control circuit 44 of system 72 also transmits the first broadcast data stream to bus control circuit 44 of system 74 via high speed link 76.

Bus control circuit 44 of system 74 receives a plurality of single data streams comprising synchronous transfer mode data and asynchronous transfer mode data from each of ingress buses 60 and the first broadcast data stream, and multiplexes the single data streams and part or all of the data from the first broadcast data stream into a second broadcast data stream. Bus control circuit 44 of system 74 then transmits the second broadcast data stream to STSM circuits 42 over egress buses 62. Bus control circuit 44 of system 74 also transmits the second broadcast data stream to bus control circuit 44 of system 72 via high speed link 76. Bus control circuit 44 of system 72 receives the second broadcast data stream, and multiplexes part or all of the data from the second broadcast data stream into the first broadcast data stream.

Figure 3:
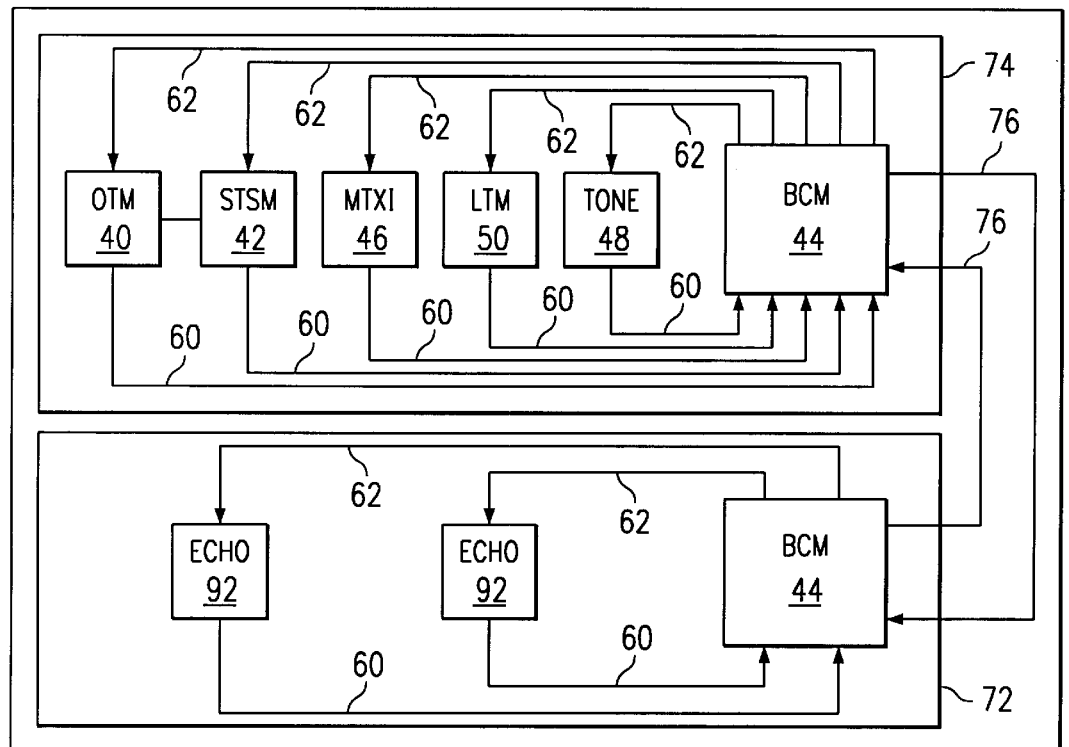
FIG. 3 is a block diagram of typical connections between application circuits and bus control circuits embodying concepts of the present invention.

FIG. 3 is a connection diagram for bus control system 90 constructed in accordance with teachings of the present invention. Bus control system 90 includes system 72 and system 74. System 74 includes STSM circuit 42, optical interface circuit 40, matrix interface circuit 46, tone recognition circuit 48, and high speed line trunk processor circuit 50, each of which are coupled as shown to bus control circuit 44 by ingress buses 60 and egress buses 62. System 72 includes echo canceler circuits (ECHO) 92, which are coupled to bus control circuit 44 by ingress buses 60 and egress buses 62. Bus control circuits 44 of system 72 and system 74 are coupled together by high speed link 76.

STSM circuit 42, matrix interface circuit 46, tone recognition circuit 48, and high speed line trunk processor circuit 50 are application circuits that transmit data over ingress bus 60 and receive data over egress bus 62 in predetermined formats. This data may include synchronous transfer mode data and asynchronous transfer mode data, such as iMPAX packet layer datagrams. Each application circuit may include a modular bus interface circuit (not explicitly shown). The modular bus interface circuit receives data from the application circuit and converts it into a predetermined format for transmission over ingress bus 60. The modular bus interface circuit also receives data in a predetermined format over egress bus 62 and converts it into a format that is useable by the application circuit associated with the bus interface circuit.

Optical interface circuit 40 receives the broadcast data stream from egress bus 62 and transmits a data stream over ingress bus 60 to bus control circuit 44. The data received and transmitted by optical interface circuit typically includes only asynchronous transfer mode data in the form of iMPAX packet layer datagrams, which are used to carry control data and control commands between the components of fiber optic connection unit 14. Synchronous transfer mode data could also be received by and transmitted to optical interface circuit 40 over ingress bus 60 and egress bus 62.

Echo canceler circuit 92 includes one or more digital signal processors (not explicitly shown) that are operable to remove echo signals from individual DS-0 data channels that are included in the broadcast data stream. Echo canceler circuit 92 may include a single circuit card that has plug-in connectors (not explicitly shown) to allow the card to be easily installed in a cabinet containing other component circuit cards of fiber optic connection unit 14. Alternatively, echo canceler circuit 92 may include two or more circuit cards, or one or more discrete components on a single circuit card.

Bus control circuits 44 of system 72 and system 74 of bus control system 90 receive single data streams from each ingress bus 60 and multiplex the data to form a first broadcast data stream and a second broadcast data stream, respectively. The first and second broadcast data streams are then transmitted to application circuits via egress buses 62, and to bus control circuit 44 of the alternate plane by high speed link 76.

In operation, data streams are received at optical interface circuit 40 and are transmitted to STSM circuits 42 for subsequent transmission to bus control circuit 44 via ingress bus 60. These telecommunications data streams are then multiplexed by bus control circuit 44 and are transmitted in a single broadcast data stream over egress buses 62 and high speed link 76 to other application circuits.

For example, the broadcast data stream of bus control circuit 44 of system 72 may be received at tone recognition circuit 48. Tone recognition circuit 44 processes individual DS-0 data channels that are contained within the broadcast data stream to identify dual tone multi-frequency (DTMF) tone signals that are included in the individual DS-0 data channels. Alternatively or in addition, the broadcast data stream may be received at matrix interface circuit 46 to be transmitted to switch 12 for switching of individual DS-0 data channels through the matrix fabric of switch 12. The first broadcast data stream may also be transmitted to echo canceler circuit 92 through high speed link 76 and subsequent multiplexing into the second broadcast data stream by bus control circuit 44 of system 74 in order to be processed for cancellation of echo signals.

Figure 4:
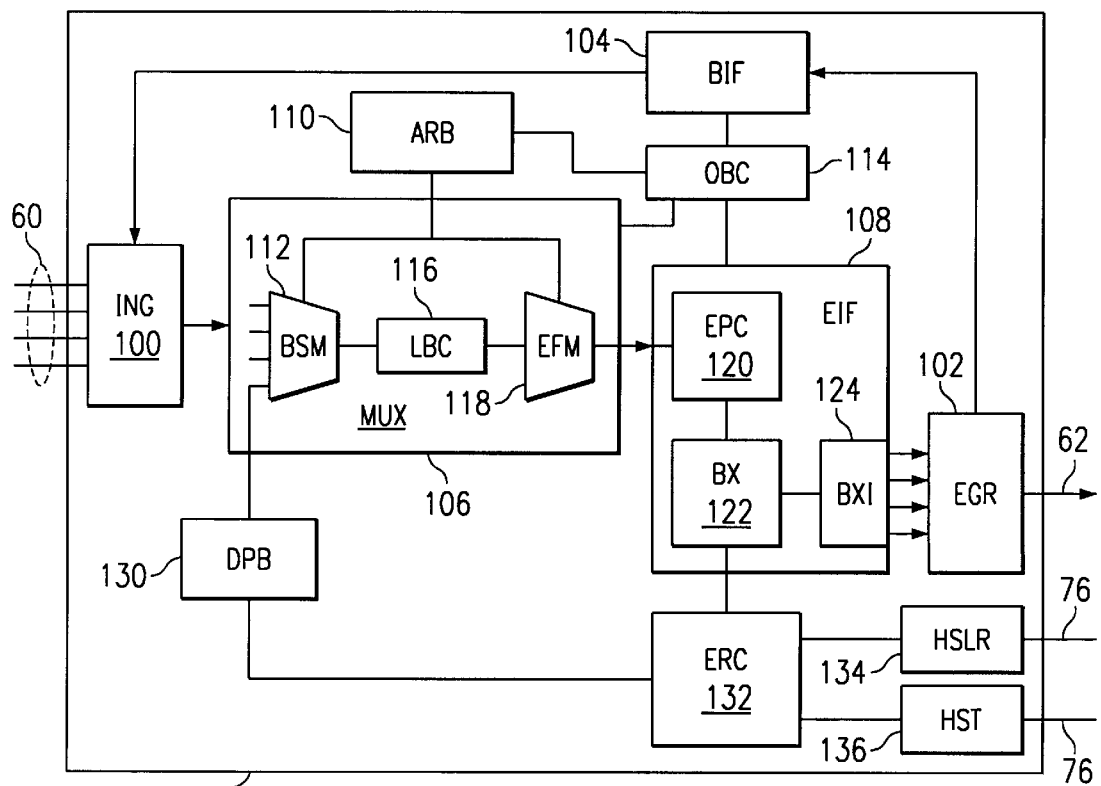
FIG. 4 is a block diagram of connections between components of a bus control circuit embodying concepts of the present invention.

FIG. 4 is a block diagram of bus control circuit 44 of bus control system 70 and bus control system 90. Bus control circuit 44 includes ingress interface circuit (ING) 100, which is coupled to a plurality of ingress buses 60. Ingress interface circuit 100 includes data buffers (not explicitly shown) for storing asynchronous transfer mode data and bypass connection circuits for carrying synchronous transfer mode data. The outputs of the data buffers and bypass connection circuits are coupled to the inputs to multiplexer circuit (MUX) 106. A bus interface and timing circuit (BIF) 104 is also coupled to ingress interface circuit 100.

Bus interface and timing circuit 104 is a modular interface circuit that is used to receive the broadcast data stream from egress bus 62 and to transmit a single data stream over an ingress bus 60. As shown in FIG. 4, bus interface and timing circuit 104 is used to receive the broadcast data stream from 102 and to transmit it to ingress interface circuit 100. Control data received from on-board controller circuit 114 is used to selectively control the data that is transmitted to ingress interface circuit 100 in the event that the bandwidth of the data signal on egress bus 62 is greater than the bandwidth of the data signal on ingress bus 60. Bus interface and timing circuit 104 decodes control data from the broadcast data stream and encodes control data into the single data stream transmitted to the ingress interface.

Multiplexer circuit 106 includes bus slot multiplexer circuit (BSM) 112 which is coupled to link buffer circuits (LBC) 116, on-board controller circuit (OBC) 114, and dual port buffer circuit (DPB) 130. Data received from ingress interface circuit 100 and dual port buffer circuit 130 is multiplexed by bus slot multiplexer circuit 112 in response to control data received from on-board controller circuit 114. Data transmitted over ingress buses 60 and egress bus 62 includes a plurality of bus slots, where each bus slot is a 64 byte data format that may comprise a synchronous transfer mode datagram, an asynchronous transfer mode datagram, or an idle datagram. Each datagram contains control data such as packet type indicators and cyclic redundancy check data that is used by the ingress interface circuit 100 or egress interface circuit 108 for diagnostic purposes, such as to verify frame alignment, detect control record check errors, detect frame synchronization/presence errors, detect packet type indicator errors, or other suitable diagnostic purposes.

On-board controller circuit 114 is a modular control circuit that may be installed on the same circuit card as bus controller circuit 44, or on an attached daughtercard. On-board controller circuit 114 is coupled to bus interface circuit 104, arbiter circuit 110, multiplexer circuit 106, egress interface 108, and other components of bus controller circuit 44. On-board controller circuit 114 receives control data from and transmits control data to arbiter circuit (ARB) 110 that is used to provide control data to bus slot multiplexer circuit 112 and an egress frame multiplexer circuit (EFM) 118.

Arbiter circuit 110 is used to programmably allocate the bandwidth for each of the data streams received from the plurality of ingress buses 60 received at ingress interface circuit 100. For example, each of the ingress buses 60 may transmit an 8-bit data channel operating at a frequency of 25.92 MHZ, with an effective data bandwidth of approximately 200 million bits per second. The egress bus 62 may transmit a 16-bit data channel operating at a frequency of 51.84 MHZ, with an effective data bandwidth of approximately 800 million bits per second. Control data received from arbiter circuit 110 is used to allocate data bandwidth for each of the ingress buses received at ingress interface circuit 100 in the event that greater than 800 million bits per second of data are received from all of the ingress buses 60.

Dual port buffer circuit 130 receives a broadcast data stream from a bus control circuit 44 via high-speed link 76, which is a 16-bit parallel data channel operating at 51.84 MHZ. A high-speed link receiver circuit (HSLR) 134 is coupled to high-speed link 76 and transfers the broadcast data stream to egress reformatter circuit (ERC) 132, which converts the broadcast data channel into two 8-bit parallel data channels operating at a frequency of 25.92 MHZ. The converted broadcast data stream is then provided to multiplexer circuit 112 by dual port buffer circuit 130. Arbiter circuit 110 also controls the allocation of bandwidth for the broadcast data stream provided by dual port buffer circuit 130.

Data received at multiplexer circuit 112 is multiplexed by selectively storing the data in one of four link buffer circuits 116 in response to control data received from arbiter circuit 110. Data from link buffer circuits 116 is then multiplexed with egress header data by egress frame multiplexer 118 to form a broadcast data stream.

The broadcast data stream is transmitted to egress interface (EIF) 108, which includes an egress processor circuit (EPC) 120, a broadcaster circuit BX) 122, and a broadcaster interface circuit (BXI) 124. The broadcast stream is transmitted from broadcaster circuit 122 to egress reformatter circuit 132 for transmission to high speed transmitter circuit (HST) 136 and high-speed link 76. Broadcaster interface circuit 124 transmits sixteen redundant broadcast data streams to egress bus drivers 102, which boost the signal strength of the broadcast data stream for transmission over egress buses 62.

In operation, a plurality of single data streams are received at ingress interface circuit 100 of bus control circuit 44 from ingress buses 60. Administration and control data is extracted and diagnostic data analysis is performed on the administration and control data. Asynchronous transfer mode data is temporarily stored in data buffers, and synchronous transfer mode data is transmitted directly to bus slot multiplexer 112. In addition, broadcast data stream data received from one or more other bus control circuits 44 is also transmitted to bus slot multiplexer 112. Asynchronous transfer mode data from data buffers in ingress interface circuit 100 is transmitted to bus slot multiplexer circuit 112 on a rotating priority as determined by arbiter circuit 110.

In this manner, a data channel may be received from STSM circuit 42, transmitted through bus control circuit 44, and routed to other application circuits for data processing, such as switching, echo cancellation, tone detection, or other suitable data processing. The DS-0 data may then be routed back to bus control circuit 44, and may ultimately be transmitted back to STSM circuit 42. The bandwidth of data received from any given application circuit may be controlled, and data processing may be performed on the data while it is being combined with other data without preventing errors from being detected or interfering with error detection and diagnostic functions.

Bus slot multiplexer circuit 112 stores multiplexed data in link data buffer circuits 116 in response to control data received from arbiter circuit 110 as programmed by the on-board controller circuit 114. Link data buffer circuits 116 then transfer data to egress frame multiplexer circuit 118, which combines the data from the link data buffer circuits 116 with egress header data to form a broadcast data stream.

The broadcast data stream is then transmitted by high speed link 76 to one or more bus control circuits 44, and by egress bus driver circuits 102 to egress buses 62.

Figure 5:
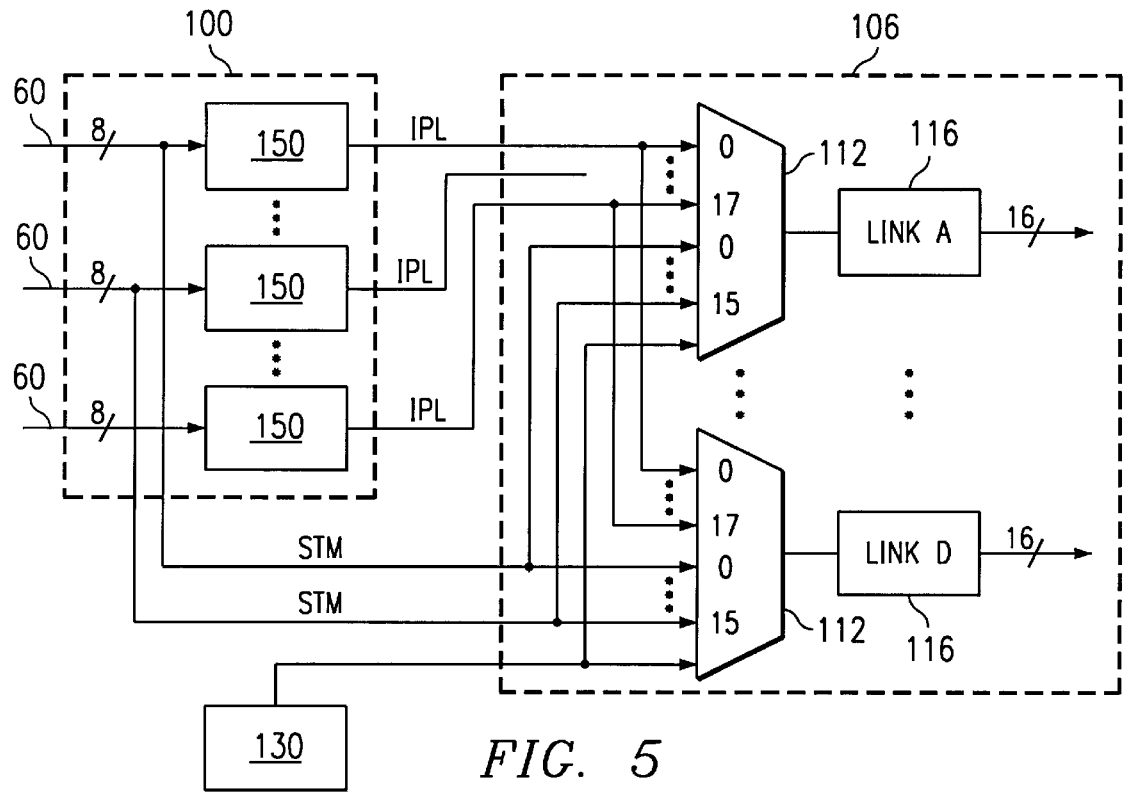
FIG. 5 is a functional block diagram of a bus control circuit embodying concepts of the present invention.

FIG. 5 is a block diagram showing the connections between ingress buses 60, ingress interface circuit 100, and multiplexer circuit 106 in accordance with teachings of the present invention. Each ingress bus 60 is coupled to an ingress data buffer circuit (IDB) 150, which is a data storage device that selectively stores and transmits data. Asynchronous transfer mode data in the single data stream received at ingress interface circuit 100 from an ingress bus 60 is temporarily stored in the corresponding ingress data buffer circuit 150 for subsequent transmission to bus slot multiplexer circuit 112.

Synchronous transfer mode data from each single data stream is transmitted to bus slot multiplexer circuit 112. Synchronous transfer mode data from the broadcast data stream is received from dual port buffer circuit 130 and transmitted directly to bus slot multiplexer circuit 112. Each bus slot multiplexer circuit 112 is a multiplexer that selectively stores received data in the associated link buffer circuit 116. The output from link buffer circuits 116 is a 16-bit parallel data stream.

In operation, asynchronous transfer mode data is stored in ingress data buffer circuits 150 until the asynchronous transfer mode data is selected for transmission. Each ingress data buffer circuit 150 has a predetermined data storage capacity and stores new asynchronous transfer mode data while transmitting presently stored data. This asynchronous transfer mode data is transmitted to bus slot multiplexer circuits 112 along with synchronous transfer mode data. Control data for selecting by multiplexer 112 is derived from control data generated by arbiter circuit 110. Storage of multiplexed data in link buffer circuits 116 is controlled in order to perform broadcast switching of both synchronous transfer mode data and asynchronous transfer mode data.

Figure 6:
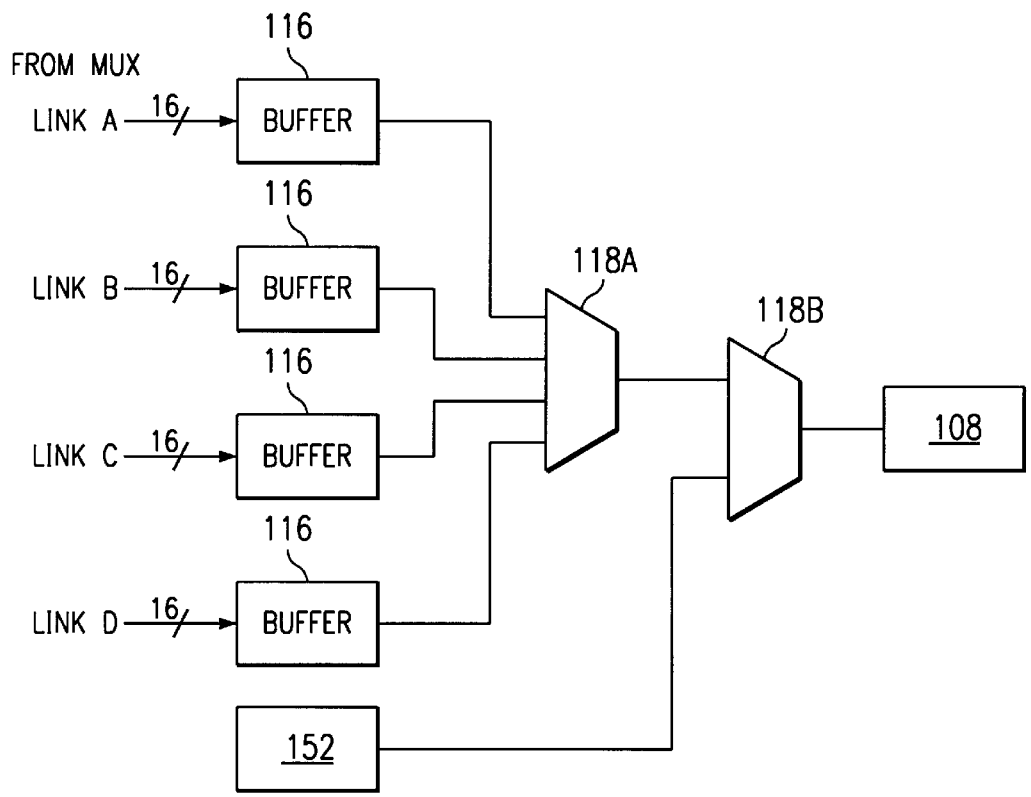
FIG. 6 is a block diagram showing the connections between link buffer circuits, the header buffer, and the egress frame multiplexer first stage and second stage in accordance with teachings of the present invention.

FIG. 6 is a block diagram showing the connections between link buffer circuits 116, header buffer circuit 152, and egress frame multiplexers first stage 118A and second stage 118B in accordance with teachings of the present invention. Link data buffer circuits 116 are coupled to egress frame multiplexer first stage 118A, which multiplexes data streams from the four link data buffer circuits 116 into an intermediate data stream. Frame header data stored in header buffer circuit 152 is then multiplexed with the intermediate data channel by egress frame multiplexer second stage 118B to form the broadcast data channel. The broadcast data channel is then transmitted to egress interface circuit 108.

Figure 7:
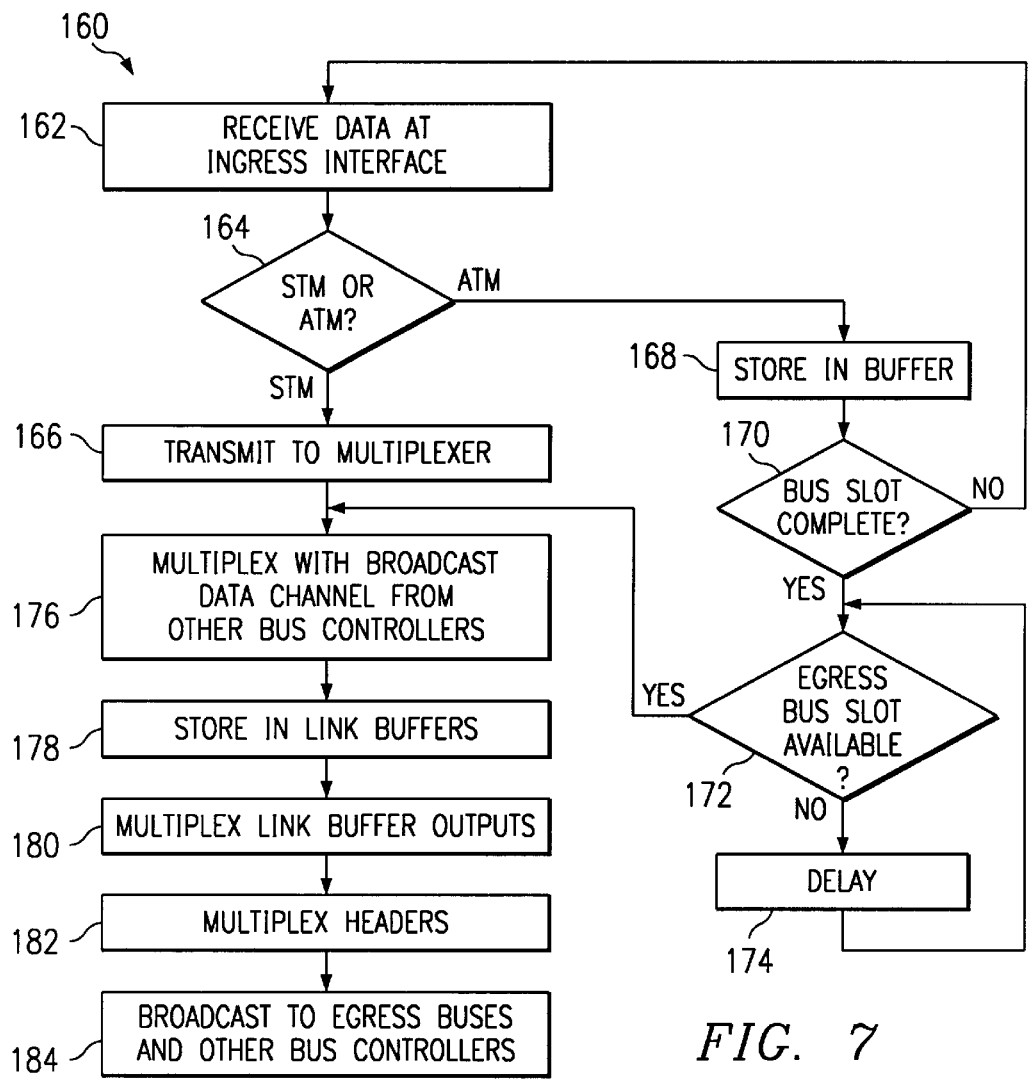
FIG. 7 is a flow chart of a method for controlling data transmission in accordance with teachings of the present invention.

FIG. 7 is a flow chart of a method 160 for controlling data transmission in accordance with teachings of the present invention. Method 160 begins at step 162, where data is received at an ingress interface of a bus control circuit. At step 164, it is determined whether the data is synchronous transfer mode data or asynchronous transfer mode data. If the data is synchronous transfer mode data, it is transmitted directly to one of four multiplexer circuits at step 166.

If the data is asynchronous transfer mode data, the method proceeds to step 168, where the data is stored in an ingress data buffer. At step 170, it is determined whether a complete bus slot of asynchronous transfer mode data has been received. If the asynchronous transfer mode frame is not complete, the method returns to step 162, where additional data is received. If the asynchronous transfer mode frame is complete, the method proceeds to step 172.

At step 172, it is determined whether a data request for the asynchronous transfer mode data has been received from the application circuit. If the application circuit has not transmitted a data request, the method proceeds to step 174, where a predetermined delay period is allowed to elapse. The method then returns to step 172, and the process repeats until a data request is received for the asynchronous transfer mode data.

At step 176, the asynchronous transfer mode data and synchronous transfer mode data is multiplexed at one of four multiplexers with data received from the broadcast data stream received from other bus control circuits. At step 178, the multiplexed data is stored in one of four link buffers, and is then multiplexed with other link buffer outputs at step 180. Egress header data is then multiplexed with the data at step 182, and the broadcast data stream is then transmitted over egress data buses and to other bus control circuits.

Figure 8:
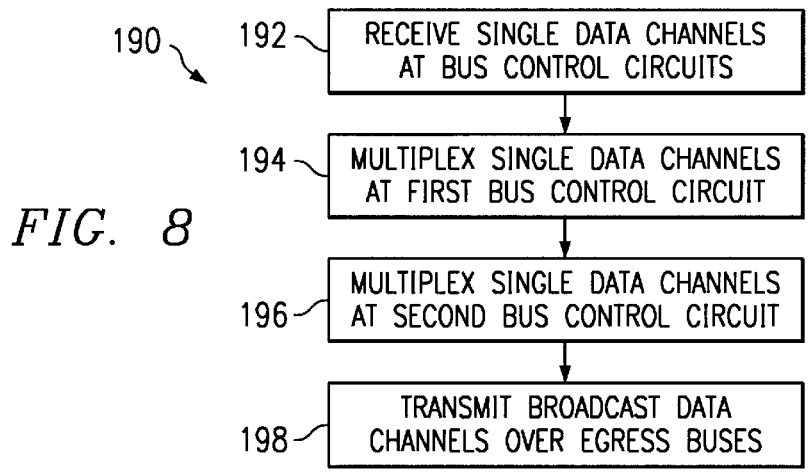
FIG. 8 is a flow chart of a method for controlling a data transmission system in accordance with teachings of the present invention.

FIG. 8 is a flow chart of a method 190 for controlling a data transmission system in accordance with teachings of the present invention. Method 190 begins at step 192, where two or more single data streams are received at each of a plurality of bus control circuits. The single data streams received at one bus control circuit may include the broadcast data stream from other bus control circuits.

At step 194, the single data streams are multiplexed at the first bus control circuit to form the first broadcast data stream. The multiplexing of the single data streams and the second broadcast data stream may be performed in accordance with method 160 shown in FIG. 7, or by other suitable methods. At step 196, the single data streams are multiplexed at the second bus control circuit to form the second broadcast data stream. The multiplexing of the single data streams and the second broadcast data stream may be performed in accordance with method 160 shown in FIG. 7, or by other suitable methods.

At step 198, the first broadcast data stream is then transmitted over two or more egress data buses that are coupled to the first bus control circuit, and the second broadcast data stream is then transmitted over two or more egress data buses that are coupled to the second bus control circuit. As previously noted, the first broadcast data stream may also be transmitted to the second bus control circuit, and the second broadcast control circuit may also be transmitted to the first bus data stream.

In operation, two or more single data streams are received at each of two bus control circuits from corresponding application circuits, and are multiplexed to form a first and a second broadcast data stream. The first and second broadcast data streams are also received at the second and the first bus control circuits, respectively. In this manner, data from any of the single data streams received at either the first or second bus control circuits can be multiplexed into either or both of the broadcast data streams.

The broadcast data streams are then transmitted via egress data buses to each of the application circuits. In this manner, data may be switched by broadcasting the data in a predetermined time slot location. Data may also be extracted from the single data streams and transmitted to a conventional telecommunications switch having M input ports and M output ports. In addition, the data may be processed by transmitting the data to a suitable data processing equipment, such as echo canceler circuits or tone detection circuits.

The present invention provides many important technical advantages. One technical advantage of the present invention is a data bus controller with the ability to control both synchronous transfer mode data and asynchronous transfer mode data. Another advantage of the present invention is a system for data bus control that allows multiple incoming data buses to be multiplexed into a single outgoing data bus.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A data bus controller comprising:

an ingress interface operable to receive a plurality of single data streams of encoded data, the ingress interface operable to determine whether the encoded data is synchronous or asynchronous, the ingress interface operable to extract and transmit the synchronous encoded data, the ingress interface operable to extract and gather a complete bus slot of asynchronous encoded prior to transmission;

a multiplexer coupled to the ingress interface, the multiplexer operable to combine the synchronous and asynchronous encoded data within the plurality of single data streams received at the ingress interface into a broadcast data stream of encoded data;

an egress interface coupled to the multiplexer, the egress interface operable to transmit the broadcast data stream; and an arbiter coupled to the multiplexer, the arbiter operable to generate control data for controlling the multiplexing of the synchronous and asynchronous encoded data within the plurality of single data streams and to transmit the control data to the multiplexer.

2. The data bus controller of claim 1 wherein the plurality of single data streams comprise 8 parallel bits of data operating at a frequency of 25.92 MHZ.

3. The data bus controller of claim 1 wherein the broadcast data stream comprises 16 parallel bits of data operating at a frequency of 51.84 MHZ.

4. The data bus controller of claim 1 further comprising a bus interface circuit coupled to the ingress interface and the egress interface, the bus interface circuit operable to decode control data from the broadcast data stream, the bus interface circuit further operable to encode control data into the single data stream transmitted to the ingress interface.

5. The data bus controller of claim 1 further comprising an egress reformatter circuit coupled to the multiplexer, the egress reformatter circuit operable to receive data at a first frequency and having a first bit structure and to transmit the data at a second frequency and having a second bit structure.

6. A data bus controller comprising:

an ingress interface operable to receive a plurality of single data streams of encoded data;

a multiplexer coupled to the ingress interface, the multiplexer operable to combine the plurality of single data streams received at the ingress interface into a broadcast data stream of encoded data;

an egress interface coupled to the multiplexer, the egress interface operable to transmit the broadcast data stream; and an arbiter coupled to the multiplexer, the arbiter operable to generate control data for controlling the multiplexing of the plurality of single data streams and to transmit the control data to the multiplexer;

an egress reformatter circuit coupled to the multiplexer, the egress reformatter circuit operable to receive data at a first frequency and having a first bit structure and to transmit the data at a second frequency and having a second bit structure, wherein the first frequency is 51.84 MHZ, the first bit structure is a single 16-bit bus, the second frequency is 25.92 MHZ, and the second bit structure is two 8-bit buses.

7. A data bus controller comprising:

an ingress interface operable to receive a plurality of single data streams of encoded data;

a multiplexer coupled to the ingress interface, the multiplexer operable to combine the plurality of single data streams received at the ingress interface into a broadcast data stream of encoded data;

an egress interface coupled to the multiplexer, the egress interface operable to transmit the broadcast data stream; and an arbiter coupled to the multiplexer, the arbiter operable to generate control data for controlling the multiplexing of the plurality of single data streams and to transmit the control data to the multiplexer;

an egress reformatter circuit coupled to thp multiplexer, the egress reformatter circuit operable to receive data at a first frequency and having a first bit structure and to transmit the data at a second frequency and having a second bit structure, wherein the plurality of single data streams comprise 8 parallel bits of data operating at a frequency of 25.92 MHZ.

8. A data bus controller comprising:

an ingress interface operable to receive a plurality of single data streams of encoded data;

a multiplexer coupled to the ingress interface, the multiplexer operable to combine the plurality of single data streams received at the ingress interface into a broadcast data stream of encoded data;

an egress interface coupled to the multiplexer, the egress interface operable to transmit the broadcast data stream; and an arbiter coupled to the multiplexer, the arbiter operable to generate control data for controlling the multiplexing of the plurality of single data streams and to transmit the control data to the multiplexer;

an egress reformatter circuit coupled to the multiplexer, the egress reformatter circuit operable to receive data at a first frequency and having a first bit structure and to transmit the data at a second frequency and having a second bit structure, wherein the broadcast data stream comprises 16 parallel bits of data operating at a frequency of 51.84 MHZ.

9. The data bus controller of claim 1 wherein the multiplexer further comprises:

a plurality of first data buffers coupled to the ingress interface, each first data buffer operable to receive one of the plurality of single data streams and to selectively store and transmit the data;

a plurality of link multiplexers coupled to the ingress interface and the plurality of first data buffers, each link multiplexer operable to receive data from the first data buffer and the ingress interface and to selectively combine the data into a single link data stream;

a plurality of link buffers, each link buffer coupled to a corresponding link multiplexer and operable to receive the corresponding single link data stream and to selectively store and transmit the data;

a first egress multiplexer coupled to each link buffer, the first egress multiplexer operable to receive data from the link buffers and to combine the data into an intermediate broadcast data stream;

an egress header buffer operable to receive broadcast data stream header data and to selectively store and transmit the broadcast data stream header data; and a second egress multiplexer coupled to the first egress multiplexer and the egress header buffer operable to receive the intermediate broadcast data stream and broadcast stream header data from the egress header buffer, to combine the intermediate broadcast data stream and the egress header buffer into a broadcast data stream, and to transmit the broadcast data stream.

10. A data bus controller comprising:

an ingress interface operable to receive a plurality of single data streams of encoded data;

a multiplexer coupled to the ingress interface, the multiplexer operable to combine the plurality of single data streams received at the ingress interface into a broadcast data stream of encoded data, wherein the multiplexer includes:

a plurality of first data buffers coupled to the ingress interface, each first data buffer operable to receive one of the plurality of single data streams and to selectively store and transmit the data;

a plurality of link multiplexers coupled to the ingress interface and the plurality of first data buffers, each link multiplexer operable to receive data from the first data buffer and the ingress interface and to selectively combine the data into a single link data stream;

a plurality of link buffers, each link buffer coupled to a corresponding link multiplexer and operable to receive the corresponding single link data stream and to selectively store and transmit the data;

a first egress multiplexer coupled to each link buffer, the first egress multiplexer operable to receive data from the link buffers and to combine the data into an intermediate broadcast data stream;

an egress header buffer operable to receive broadcast data stream header data and to selectively store and transmit the broadcast data stream header data; and a second egress multiplexer coupled to the first egress multiplexer and the egress header buffer and operable to receive the intermediate broadcast data stream and broadcast stream header data from the egress header buffer, to combine the intermediate broadcast data stream and the egress header buffer into a broadcast data stream, and to transmit the broadcast data stream;

an egress reformatter circuit coupled to the link multiplexers, the egress reformatter circuit operable to receive data at a first frequency and having a first bit structure and to transmit the data at a second frequency and having a second bit structure; and the link multiplexers further operable to receive data from the egress reformatter circuit and to selectively combine the data into the single link data stream with the data received from the first data buffer and the ingress interface;

an egress interface coupled to the multiplexer, the egress interface operable to transmit the broadcast data stream; and an arbiter coupled to the multiplexer, the arbiter operable to generate control data for controlling the multiplexing of the plurality of single data streams and to transmit the control data to the multiplexer.

11. The data bus controller of claim 10 wherein the first frequency is 51.84 MHZ, the first bit structure is a single 16-bit bus, the second frequency is 25.92 MHZ, and the second bit structure is four 8-bit buses.

12. The data bus controller of claim 10 wherein the plurality of single data streams comprise 8 parallel bits of data operating at a frequency of 25.92 MHZ.

13. The data bus controller of claim 10 wherein the broadcast data stream comprises 16 parallel bits of data operating at a frequency of 51.84 MHZ.

14. The data bus controller of claim 1 wherein the data bus controller is configured as a single circuit card for use in a data transmission system, with plug-in connectors that allow the card to be easily installed and removed.

15. The data bus controller of claim 1 wherein the data bus controller is configured as a single circuit card for use in an optical fiber termination system for interfacing with a telecommunications switch, with plug-in connectors that allow the card to be easily installed and removed.

16. A system for controlling data transmission comprising:

a plurality of ingress data buses, each ingress data bus carrying a single data stream of encoded data;

a plurality of egress data buses, each egress data bus carrying one of a first broadcast data stream and a second broadcast data stream of encoded data;

a first data bus controller coupled to selected ingress data buses and selected egress data buses, the first data bus controller operable to receive the single data streams of data from each corresponding ingress data bus, the first data bus controller is further operable to multiplex data from each of the single data streams into the first broadcast data stream and to transmit the first broadcast data stream over selected egress data buses;

a second data bus controller coupled to selected ingress data buses and selected egress data buses, the second data bus controller operable to receive the single data streams of data from each corresponding ingress data bus, the second data bus controller is further operable to multiplex data from each of the single data streams into the second broadcast data stream and to transmit the second broadcast data stream over selected egress data buses and to the first data bus controller;

the first data bus controller is operable to receive the second broadcast data stream and to multiplex selected data from the second broadcast data stream into the first broadcast data stream, the first data bus controller is further operable to transmit the first broadcast data stream to the second data bus controller; and the second data bus controller is operable to receive the first broadcast data stream and to multiplex selected data from the first broadcast data stream into the second broadcast data stream.

17. The system of claim 16 wherein the first and the second data bus controller each further comprise:

an ingress interface operable to receive selected single data streams of encoded data;

a multiplexer coupled to the ingress interface, the multiplexer operable to combine the selected single data streams received at the ingress interface into one of the first and second broadcast data stream of encoded data;

an egress interface coupled to the multiplexer, the egress interface operable to transmit the one of the first and second broadcast data stream; and an arbiter coupled to the multiplexer, the arbiter operable to generate control data for controlling the multiplexing of the selected single data streams and to transmit the control data to the multiplexer.

18. The system of claim 16 wherein the plurality of single data streams comprise 8 parallel bits of data operating at a frequency of 25.92 MHZ.

19. The system of claim 16 wherein the broadcast data stream comprises 16 parallel bits of data operating at a frequency of 51.84 MHZ.

20. The system of claim 16 wherein each data bus controller further comprises a bus interface circuit coupled to the ingress interface and the egress interface, the bus interface circuit operable to decode control data from the broadcast data stream received from the egress interface, the bus interface circuit further operable to encode control data into a data stream transmitted to the ingress interface.

21. The system of claim 16 wherein each of the data bus controllers further comprise an egress reformatter circuit coupled to the multiplexer of the corresponding data bus controller, the egress reformatter circuit operable to receive data from the other data bus controller at a first frequency and having a first bit structure and to transmit the data to the multiplexer at a second frequency and having a second bit structure.

22. The system of claim 16 wherein each of the ingress data buses and egress data buses is coupled to a corresponding application circuit.

23. The system of claim 22 wherein each application circuit is one of an optical termination circuit, a synchronous data transmission circuit, a switch interface circuit, a data processor circuit, a digital signal processor circuit, a tone detection circuit, and an echo canceler circuit.

24. The system of claim 22 wherein each application circuit is configured as a single circuit card for use in a data transmission system, with plug-in connectors that allow the card to be easily installed and removed.

25. The system of claim 22 wherein each application circuit is configured as a single circuit card for use in an optical fiber termination system for interfacing with a telecommunications switch, with plug-in connectors that allow the card to be easily installed and removed.

26. The system of claim 16 wherein each data bus controller is configured as a single circuit card for use in a data transmission system, with plug-in connectors that allow the card to be easily installed and removed.

27. The system of claim 16 wherein each data bus controller is configured as a single circuit card for use in an optical fiber termination system for interfacing with a telecommunications switch, with plug-in connectors that allow the card to be easily installed and removed.

28. A method for controlling data transmission, the method comprising:
receiving a first and second plurality of single data streams from a first and second plurality of ingress data buses at a first bus control circuit and a second bus control circuit, respectively, each data stream having a first bit structure and a first frequency;
extracting synchronous data and asynchronous data within the first and second plurality of single data streams;
gatherings a complete bus slot of the asynchronous data;
multiplexing the synchronous and asynchronous data within the first single data streams at the first bus control circuit into a first broadcast data stream having a second bit structure and a second frequency;
multiplexing the synchronous and asynchronous data within the second single data streams at the second bus control circuit into a second broadcast data stream having the second bit structure and the second frequency; and
transmitting the first and second broadcast data stream over a plurality of egress data buses.

29. A method for controlling data transmission, the method comprising:
receiving a first and second plurality of single data streams from a first and second plurality of ingress data buses at a first bus control circuit and a second bus control circuit, respectively, each data stream having a first bit structure and a first frequency;
multiplexing the first single data streams at the first bus control circuit into a first broadcast data stream having a second bit structure and a second frequency;
multiplexing the second single data streams at the second bus control circuit into a second broadcast data stream having the second bit structure and the second frequency; and
transmitting the first and second broadcast data stream over a plurality of egress data buses;
wherein multiplexing the first single data streams at the first bus control circuit comprises:
receiving the first plurality of first single data streams at a first ingress interface;
storing the data from each first single data stream in one of a plurality of first ingress data buffers if the data is asynchronous transfer mode data;
transmitting the data directly to a first bus slot multiplexer if the data is synchronous transfer mode data;
transmitting the asynchronous transfer mode data to the first bus slot multiplexer from the first ingress data buffer if a complete data frame has been received and if there is available bandwidth;
multiplexing the synchronous transfer mode data, the asynchronous transfer mode data, and the second broadcast data stream with the first bus slot multiplexer to form an intermediate data stream;
selectively storing the intermediate data stream at one of a plurality of link data buffers;
multiplexing the data stored in the link data buffers at a first egress frame multiplexer first stage to form a first intermediate broadcast data stream;
multiplexing header data with the first intermediate broadcast data stream at a first egress frame multiplexer second stage to form a first broadcast data stream; and
transmitting the first broadcast data stream over the plurality of egress buses.

30. A method for controlling data transmission, the method comprising:
receiving a first and second plurality of single data streams from a first and second plurality of ingress data buses at a first bus control circuit and a second bus control circuit, respectively, each data stream having a first bit structure and a first frequency;
multiplexing the first single data streams at the first bus control circuit into a first broadcast data stream having a second bit structure and a second frequency;
multiplexing the second single data streams at the second bus control circuit into a second broadcast data stream having the second bit structure and the second frequency; and
transmitting the first and second broadcast data stream over a plurality of egress data buses;

wherein multiplexing the second single data streams at the second bus control circuit comprises:

receiving the plurality of second single data streams at a second ingress interface;

storing the data from each second single data stream in one of a plurality of second ingress data buffers if the data is asynchronous transfer mode data;

transmitting the data directly to a second bus slot multiplexer if the data is synchronous transfer mode data;

transmitting the asynchronous transfer mode data to the second bus slot multiplexer from the second ingress data buffer if a complete data frame has been received and if there is available bandwidth;

multiplexing the synchronous transfer mode data, the asynchronous transfer mode data, and the second broadcast data stream with the second bus slot multiplexer to form an intermediate data stream;

selectively storing the intermediate data stream at one of a plurality of link data buffers;

multiplexing the data stored in the link data buffers at a second egress frame multiplexer first stage to form a second intermediate broadcast data stream;

multiplexing second header data with the second intermediate broadcast data stream at a second egress frame multiplexer second stage to form a second broadcast data stream; and transmitting the second broadcast data stream over the plurality of egress buses.

31. The method of claim 29 wherein receiving the second broadcast data stream further comprises:

receiving the second broadcast data stream at a first egress reformatter circuit at a first frequency and having a first bit structure; and transmitting data from the first egress reformatter circuit to the first bus slot multiplexer at a second frequency and having a second bit structure.

32. The method of claim 30 wherein receiving the first broadcast data stream further comprises:

receiving the first broadcast data stream at a second egress reformatter circuit at a first frequency and having a first bit structure; and transmitting data from the second egress reformatter circuit to the second ingress data buffers at a second frequency and having a second bit structure.

* * * * *